Aug. 19, 1958   H. O. GEISLER ET AL   2,848,274
REMOVABLE TOP FOR TRUCK BODY
Filed July 5, 1955   2 Sheets-Sheet 1
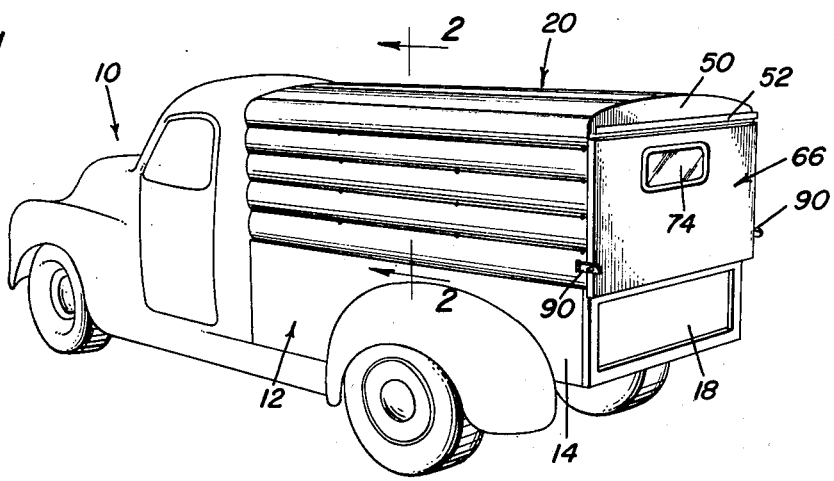
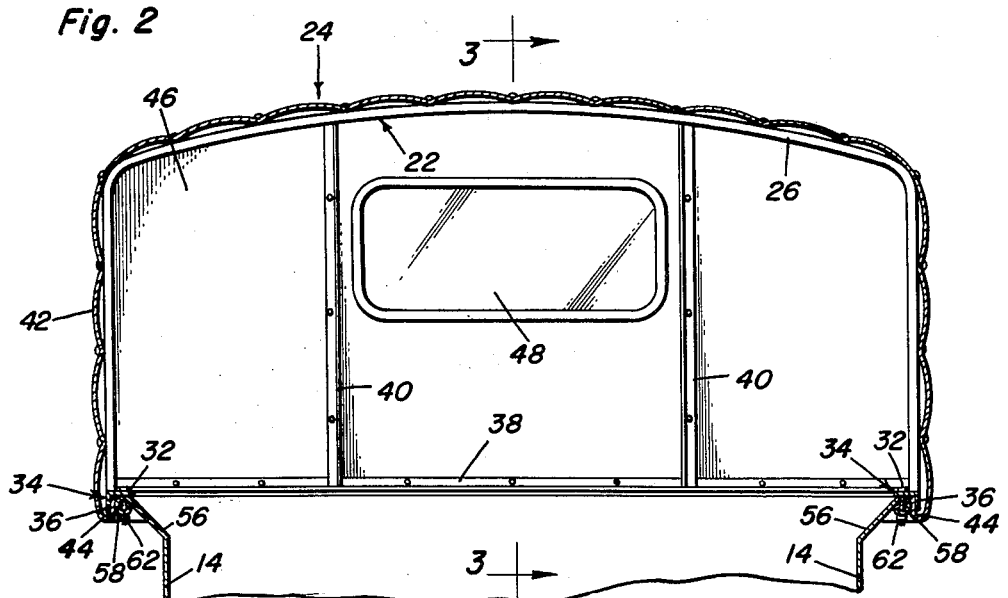
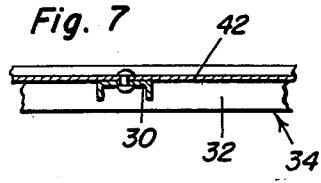
Henry O. Geisler
Clinton P. Martin
INVENTORS

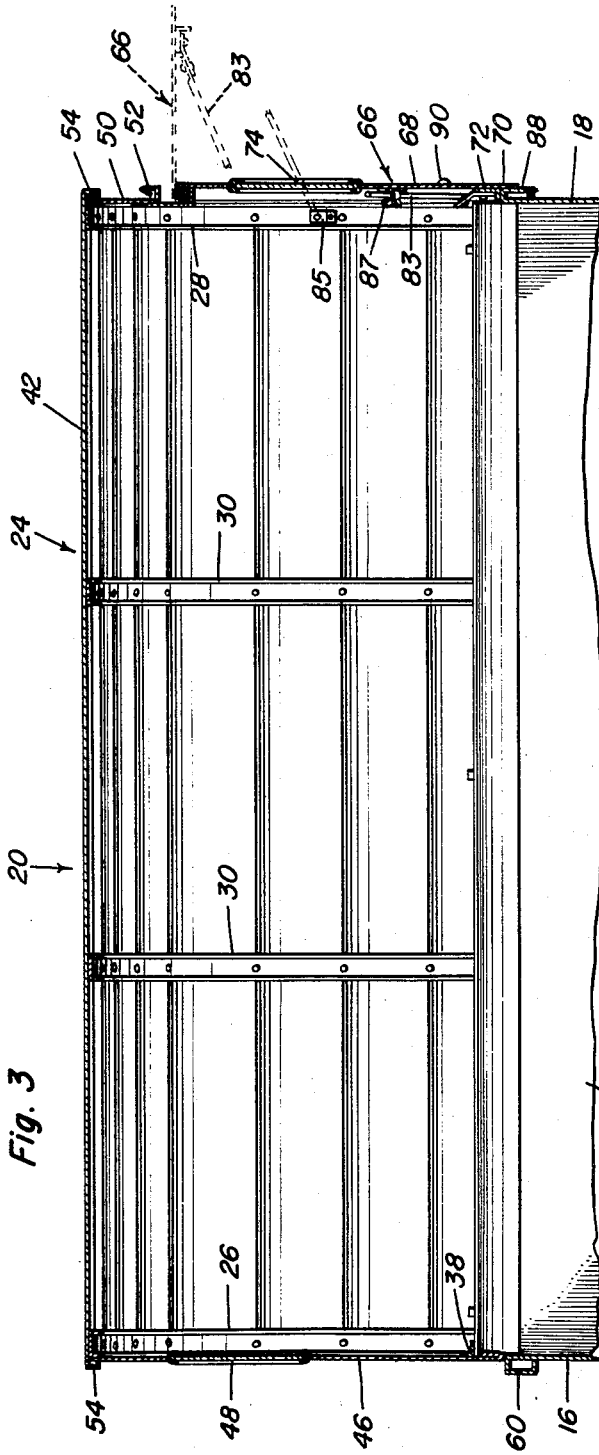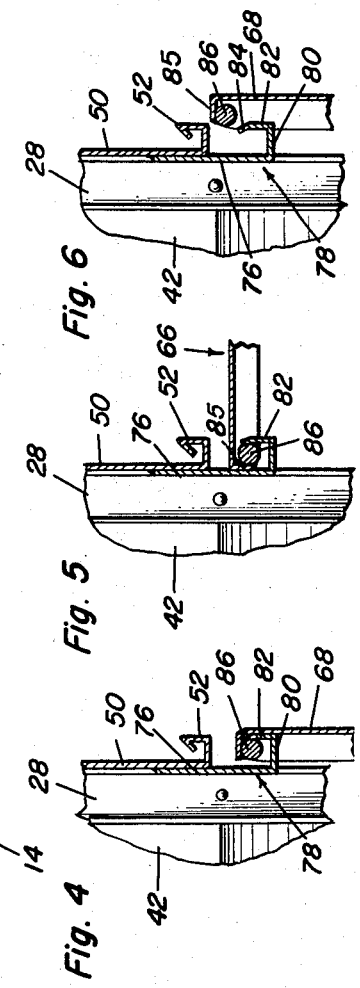

United States Patent Office 2,848,274
Patented Aug. 19, 1958

2,848,274

REMOVABLE TOP FOR TRUCK BODY

Henry O. Geisler and Clinton P. Martin, Portland, Oreg., assignors to G-M Sheet Metal Works, Portland, Oreg., a copartnership Application July 5, 1955, Serial No. 519,922

5 Claims. (Cl. 296—102)

This invention relates in general to new and useful improvements in truck body construction, and more specifically to an improved removable top for truck bodies.

The primary object of this invention is to provide a removable top for truck bodies of the pick-up truck type, the removable top being so constructed whereby it will rest upon an upper edge portion of the truck body and is releasably secured thereto by extremely simple fittings whereby the top may be quickly and easily removed and attached to a truck body.

Another object of this invention is to provide an improved removable top for truck bodies, the removable top being formed of a lightweight frame which has secured to the exterior thereof a lightweight covering, the covering being preferably formed of metal so that the removable top is not subject to the action of the elements.

Still another object of this invention is to provide an improved removable top for truck bodies, the removable top having an open rear portion which is closed by a closure, the closure being mounted in depending relation for pivotal movement to an uppermost horizontal position to permit access into the truck body and being so connected to the removable top whereby it may be quickly and easily removed and attached.

A further object of this invention is to provide an improved hinge structure which is intended for pivotally mounting members intended primarily to be mounted in depending relation, the hinge structure including an upwardly open channel and the closure having a flange normally overlying the channel, there being secured to the underside of the flange a rod seated in the channel and forming the pivot for the closure.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

Figure 1 is a rear perspective view of a conventional type of pick-up truck having mounted on the body thereof the removable top which is the subject of this invention;

Figure 2 is an enlarged fragmentary vertical sectional view taken substantially upon the plane indicated by the section line 2—2 of Figure 1 and shows the general construction of the removable top and the manner in which it is secured to the upper edge portion of the pick-up truck body;

Figure 3 is an enlarged fragmentary longitudinal vertical sectional view taken substantially upon the plane indicated by the section line 3—3 of Figure 2 and further shows the specific details of the construction of the removable top;

Figure 4 is an enlarged fragmentary vertical sectional view taken through the rear portion of the pick-up truck top and shows the details of a hinge for mounting the closure of the removable top, the closure being shown in its normal position;

Figure 5 is an enlarged fragmentary vertical sectional view similar to Figure 4 and shows the closure pivoted to an uppermost horizontal position;

Figure 6 is a fragmentary vertical sectional view on an enlarged scale similar to Figure 4 and shows the closure being removed from the supporting portion of the removable top; and Figure 7 is an enlarged fragmentary horizontal sectional view taken through the removable top and shows the details of one of the ribs thereof.

Referring now to the drawings in detail, it will be seen that there is illustrated in Figure 1 a conventional type of pickup truck which is referred to in general by the reference numeral 10. The pick-up truck 10 includes a body which is referred to in general by reference numeral 12. The body 12 is of the open type and includes side walls 14 connected at their forward ends by a front wall 16. The rear end of the pick-up truck body 12 is closed by a pivotally mounted tail gate 18.

Mounted on the pick-up truck body 12 and forming an upward extension thereof is the removable top, which is the subject of this invention, the top being referred to in general by the reference numeral 20. The top 20 includes a frame, which is referred to in general by the reference numeral 22, and a suitable covering, which is referred to in general by the reference numeral 24.

The frame 22 is formed of a plurality of transversely disposed ribs whose cross-section is best illustrated in Figure 2. The ribs include a forward rib 26, a rear rib 28, and intermediate ribs 30. The lower ends of the ribs 26, 28 and 30 are secured in overlying relation to the upper surface of a horizontal flange 32 of each of a pair of longitudinally disposed frame members 34. Each frame member 34 also includes a vertical flange 36, as is best illustrated in Figure 2. The frame 22 also includes a forward transverse frame member 38 which has connected thereto at spaced intervals vertically extending frame members 40 which extend between the frame members 38 and intermediate portions of the upper part of the rib 26.

The covering 24 includes a transversely ribbed sheet 42 which extends up across the top and down the opposite side of the frame 22. The sheet 42 terminates in upwardly open hook portions 44 which are engaged over and secured to the flanges 36. The covering 24 also includes a sheet 46 which is secured to the rib 26, the frame members 40 and the transverse frame member 38 on the exterior surfaces thereof. The sheet 46 is provided with a window 48 which is aligned with the rear window (not shown) of the pick-up truck 10.

The covering 24 further includes a sheet 50 which forms an upper rear wall portion of the top 20. Sheet 50 is secured to the upper part of the rib 28 and terminates at its lower end in a rearwardly disposed, upwardly open rain gutter 52. It will be noted that the ends of the sheet 42 terminate in reversely bent portions 54 which overlie the upper ends of the sheets 46 and 50 to form a seal with respect thereto.

Referring now to Figure 2 once again, it will be seen that the side walls 14 of the truck body 12 are outwardly flared, as at 56. The sides 14 terminate in rolled edges 58. When the top 20 is properly seated on the body 12, it rests primarily upon the rolled edges 58 and the reinforced edge 60 of the front wall 16. The frame members 34 are mounted on the rolled edges 58 with the horizontal flanges 32 resting on the rolled edges 58. Fasteners 62 are passed downwardly through the flanges 32 and the rolled edges 58 to secure the frame members 34 to the truck body 12.

The removable top is provided with an open rear portion which is normally closed by a closure, which is referred to in general by the reference numeral 66. The closure 66 is in the form of a sheet 68 which is provided at the lower end thereof with an inturned flange 70. Secured within the general confines of the lower part of the sheet 68 is a reinforcing member 72. The sheet 68 is provided with a window 74 which is so positioned whereby it may be readily viewed through.

In order that the closure 66 may be mounted for pivotal movement with respect to the top 20, there is secured to the forward face of the sheet 50 a vertical leg 76 of an upwardly open, rearwardly disposed channel member, which is referred to in general by the reference numeral 78. The channel member 78 also includes a rearwardly directed lower web 80 and a vertically disposed rear flange 82. A major portion of the channel member or channel part 78 underlies the rain gutter 52 and is protected against the elements thereby. The upper edge of the flange 82 is forwardly directed, as at 84, for a purpose to be described in more detail hereinafter.

The hinge connecting the closure 66 to the top 20 also includes a forwardly disposed flange 84 formed at the upper end of the sheet 68. Secured to the underside of the flange 85 and spaced forwardly from the sheet 68 is a circular cross-sectional rod 86.

When it is desired to mount the closure 66 on the top 20, it is disposed vertically, as is best illustrated in Figure 6. The flange 85 and the rod 86 are then moved into the space between the rain gutter 52 and the channel members 78. The rod 86 is aligned with the space between the flanges 76 and 82 and dropped therein to the position illustrated in Figure 4. In view of the forwardly directed portion 84 of the flange 82, it will be seen that there is provided a slight camming action between the flange 82 and the rod 86 and the sheet 68. This has a tendency to normally retain the closure 66 in a vertical position.

In order that the closure 66 may be retained in an open hinged position, there is pivotally secured to each side of the closure 66 a support rod 83. Each support rod 83 has an opposite end releasably engaged with a fitting 85 carried by an adjacent part of the rib 28. The support rods 83 are retained in inoperative positions by clips 87 mounted on the forward surface of the closure 66.

The tail gate 18 is provided with a rolled part 88 at the upper edge thereof on which the lower part of the closure 66 seats to form a substantial seal. The closure 66 is retained in a closed position by latch members 90 pivotally carried by opposite sides of the top 20, as is best illustrated in Figure 1.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A hinge for a depending closure and the like, said hinge comprising an upwardly open channel part, said closure having an upper flange overlying said channel part, a generally circular cross-sectional rod secured to the underside of said flange, said rod being seated in said channel part and forming in combination therewith a hinge for said closure, said channel part, said flange and said rod being coextensive.

2. A hinge for a depending closure and the like, said hinge comprising an upwardly open channel part, said closure having an upper flange overlying said channel part, a generally circular cross-sectional rod secured to the underside of said flange, said rod being seated in said channel part and forming in combination therewith a hinge for said closure, said channel part, said flange and said rod being coextensive, said channel part having a restricted opening of a size to wedgingly receive said flange and said rod.

3. A removable top for pick-up trucks comprising a frame, said frame including transverse ribs disposed in longitudinally spaced relation and connected at their lower ends by longitudinal frame members, said longitudinal frame members being adapted to rest upon upper edges of a truck body, a lightweight covering over said frame, said top having an open rear portion and an upper rear wall portion, a closure for said open rear portion depending from said rear wall portion and pivotally connected thereto, said rear wall portion including an upwardly open channel part, said closure having an upper flange overlying said channel part, a generally circular cross-sectional rod secured to the underside of said flange, said rod being seated in said channel part and forming in combination therewith a hinge for said closure, said channel part, said flange and said rod being coextensive, and a rain gutter overlying said channel part in vertically spaced relation relative thereto.

4. A truck body rear wall comprising a peripheral frame member, said frame member being vertically disposed, the upper portion of said frame member being closed by an upper rear wall portion, the lower part of said frame member being open and there being provided a closure for said lower portion, said rear wall portion including a lower upwardly open channel part, said closure being disposed in depending relation from said channel part and normally closing said lower open portion, said channel part extending between said frame, said closure having an upper flange overlying said channel part when said closure is in a depending position, said upper flange being coextensive with said channel part and having secured to the underside thereof a generally circular cross-sectional rod, said rod being seated in said channel part and forming in combination with said channel part a hinge for said closure, said upper rear wall portion including a rain gutter overlying said channel part in vertically spaced relation relative thereto.

5. A hinge for a depending closure and the like, said hinge comprising an upwardly opening channel part including a mounting flange, a lower web and a hinge flange, said hinge flange having an upper portion sloping upwardly towards said mounting flange whereby said channel part has a restricted opening, said closure having an upper flange overlying said channel part when said closure is in a depending position, a generally circular cross-sectional rod secured to the underside of said flange, said rod being seated in said channel part and forming in combination with said channel part a hinge for said closure, said channel part, said upper flange and said rod being coextensive and extending substantially the full width of said closure, the combined thicknesses of said upper flange and said rod being slightly greater than said channel part opening whereby when said closure is swung upwardly to a horizontal position, said upper flange and said rod are wedgedly disposed between the upper portion of said hinge flange and said mounting flange to retain said closure in the horizontal position.

References Cited in the file of this patent
UNITED STATES PATENTS

| | | |
|---|---|---|
| 610,010 | Winter | Aug. 30, 1898 |
| 1,059,713 | Courson | Apr. 22, 1913 |
| 1,884,441 | Welch | Oct. 25, 1932 |
| 2,690,351 | Giles | Sept. 28, 1954 |